United States Patent Office 3,422,067
Patented Jan. 14, 1969

3,422,067
NOVEL PHENOLIC RESINS EMPLOYING
BIS(p-HYDROXYCUMYL) BENZENE)
Oliver A. Barton, Florham Park, and Tibor G. Pusztai,
Verona, N.J., assignors to Allied Chemical Corporation,
New York, N.Y., a corporation of New York
No Drawing. Filed Jan. 3, 1966, Ser. No. 517,985
U.S. Cl. 260—51                         3 Claims
Int. Cl. C08g 5/10

This invention relates to novel phenolic resin compositions and to processes for their preparation. More particularly this invention relates to water-resistant phenolic resin compositions and to processes for their preparation.

Phenolic resin compositions such as phenol-formaldehyde resins are well known in the prior art and are highly useful for coatings, molded and cast articles, varnishes, laminates, and the like. However, they absorb water which results in loss of strength and dimension variation in an amount depending upon the time of exposure and the type and quantity of filler incorporated into the resin. Thus, these resins are unsuitable for applications that require a high degree of water resistance such as coatings for underwater use, marine varnishes and protective coatings for materials that are subject to corrosion by moisture.

Accordingly, it is an object of this invention to provide novel phenolic resin compositions.

It is a further object to provide phenolic resin compositions having improved water resistance.

Further objects will become apparent from the following detailed description thereof.

We have discovered that phenolic resin compositions, wherein the phenolic component comprises at least 50 mol percent of a bisphenol selected from the group consisting of 1,4-bis(p-hydroxycumyl) benzene and 1,3-bis(p-hydroxycumyl) benzene, have improved water resistance over known phenol-formaldehyde resins. Further, we have found that these resins have excellent thermal stability and that they will withstand high temperatures of over 300° C. in air without degradation.

The bisphenolic components of the invention are prepared by reacting the corresponding dicarbinol of diisopropylbenzene with phenol in the presence of anhydrous hydrochloric acid as catalyst. These bisphenols and a process for their preparation are more fully described in a copending application, United States Ser. No. 140,221 filed Sept. 25, 1961, by Broderick et al. now U.S. Patent 3,393,244. In addition to these monomers, up to 50 mol percent of other mono- or polyhydric phenolic compounds or mixtures of said phenolic compounds, which are unsubstituted in the ortho- or para-position with reference to the hydroxy group, can be added to said bisphenols. Illustrative examples of such phenolic compounds are phenol, bis(4-hydroxyphenyl)dimethylmethane, resorcinol, hydroquinone, saligenin, bis(4-hydroxyphenyl) methane, 4,4'-dihydroxybisphenol, and the like.

Resins prepared by heating the above-described phenolic components and formaldehyde are clear, fusible, amber-colored solids and can be further reacted or cured to prepare infusible solids. These resins can be prepared according to the usual commercial processes for the preparation of novoloks or acid-catalyzed resins by heating the phenolic component with formaldehyde in aqueous acid solution at a temperature of at least about 70° C. The excess water present as solvent and produced during the course of the reaction is removed, usually by vacuum distillation, to prevent loss of strength and clarity in the cured resin. Alternatively, and preferably, the resins can be prepared under anhydrous conditions at a temperature sufficient to melt the reactants as further described below so that a separate step for water removal is unnecessary. Temperatures above 250° C., however, should be avoided since they favor the formation of decomposition products.

Our preferred process comprises admixing the phenolic component as described hereinabove with an anhydrous aldehyde at a temperature from the melting point of the phenolic component up to about 250° C. and cooling the resultant product. An acid catalyst can be employed, but excellent rates are obtainable at these temperatures in the absence of catalyst.

Any anhydrous aldehyde can be employed in our process. However, the lower boiling aldehydes, although more reactive than high boiling species, will be subject to excessive losses by evaporation at temperatures above the melting point of the phenolic component. Further, an aldehyde which undergoes a minimum of side reactions under the conditions of our process is preferred. Paraformaldehyde is admirably suited for our process since it decomposes to anhydrous formaldehyde, a highly reactive aldehyde, at a temperature of about 160° C. or higher. Whenever formaldehyde is recited as reactant in the appended claims, it is intended to encompass paraformaldehyde.

No catalyst is required in our process, but an increase in rate of reaction is obtainable using an acid catalyst in a preferred amount of about 0.05 to about 0.2% by weight of the phenolic component. Suitable acids include mineral acids such as hydrochloric or sulfuric or organic acids such as oxalic or tartaric, but it is preferably one which has a boiling point higher than the temperature of the reaction.

The mol ratio of aldehyde to phenolic component employed can vary widely, but is generally within the range of 0.2:1 to 4:1. When more than 1.5 moles of aldehyde react with each mol of phenolic component, an undesirable, infusible, gelled product is obtained. Accordingly, if a high molar proportion of aldehyde is employed, formation of gelled product can be avoided by stopping the reaction, as by cooling, before more than 1.5 mols of aldehyde per mol of phenolic component have reacted. Since the rate of reaction increases with increasing temperature, the maximum reaction time for a given system containing a high molar proportion of aldehyde must be determined experimentally.

In the preferred procedure of this invention, the reaction of the aldehyde and the phenolic component is carried substantially to completion at a temperature of about 160° C. to 250° C. Under those preferred conditions, a mol ratio of aldehyde to phenolic component of 0.2:1 to 1.5:1 is employed, with the best results being obtained using a mol ratio of 0.25:1 to 1:1.

The resultant resins have softening points which vary according to the reacted molar proportion of phenolic component to aldehyde. In general, by increasing the reacted molar proportion of aldehyde to phenolic component, the softening point of the resin increases.

The fusible resins produced by our process can be cured to form infusible thermoset resins by reaction with hexamethylenetetramine under heat and pressure. The resin is finely divided and mixed with the curing agent in an amount sufficient to provide a thermoset resin and heated at a temperature between about 125° and 175° C. at a pressure between about 1000 p.s.i. and 3000 p.s.i. for at least about 5 minutes. At this time other fillers such as wood flour, cellulose fillers and fibers, mineral fillers, carbon black, and the like, as well as dyes, mold release agents, gas absorbents, etc., can be incorporated into the resin as will be known to one skilled in the art.

The infusible thermoset resins are especially useful as protective coatings for wide ranges of temperature and humidity as well as for molded articles, laminates, varnishes, and the like.

The following examples are given to further illustrate our invention, but it is to be understood that the invention is not to be limited to the details described therein.

The softening point in the examples below was determined according to the Durrans method whereby one gram of resin was melted in a standard test tube, cooled, and 17 grams of clean mercury placed on top of the solidified sample. The tube and its contents were heated again, and the temperature at which the molten resin rose to the top of the mercury was recorded as the softening point.

EXAMPLE 1

0.124 mol of 1,3-bis(p-hydroxycumyl)benzene and 0.86 gram of oxalic acid were mixed with aqueous formaldehyde at a molar ratio of the bisphenol to formaldehyde of 1:3.3 in 40 grams of ethanol at 85° C. The total reaction time was 2.5 hours. The aqueous layer was decanted and the product heated in an oil bath at 160° C. and 5 mm. g. pressure for 1.5 hours to remove water.

The resultant product was a clear lemon-yellow solid having a softening point of 66° C. The molecular weight as determined by melting point depression was 825. The resin was obtained in 95% yield.

A resin was prepared from phenol and formaldehyde in a molar ratio of 1:1.2 in a similar manner by admixing 0.73 mol of phenol in 200 grams of water and stirring in 0.23 gram of oxalic acid. The temperature was brought to 90° C. and the formaldehyde added. After 1.5 hours' reaction time, the water layer was decanted and the remainder of the water evaporated under reduced pressure as above.

The resultant product was a clear lemon-yellow solid having a molecular weight of 320 as determined by melting point depression.

A third resin was prepared in similar manner from 0.275 mol of bis(4-hydroxyphenyl)dimethylmethane, 0.94 gram of oxalic acid in 200 grams of water, and formaldehyde to bring the molar ratio of phenolic compound to formaldehyde to 1:3.4.

The resultant product was a clear lemon-yellow solid having a molecular weight of 340 as determined by melting point depression.

These three resins were further cured by admixing 13.8 grams of resin with a mixture containing 13.4 grams of wood flour, 0.8 gram of hexamethylenetetramine, 0.6 gram of magnesium oxide, and 0.3 gram of calcium stearate, pouring the mixture into a mold, and heating at 150° C. for 30 minutes under 2000 p.s.i. pressure. Weighed, molded samples were submerged in water for two months. The water absorption as measured by increase in weight is given below:

Resin: Weight increase, percent
Phenol/formaldehyde _____ 20±1
Bis(4-hydroxyphenyl)dimethylmethane/
  formaldehyde _____ 18±1
1,3 - bis(p-hydroxycumyl)benzene/formaldehyde _____ 12±1

EXAMPLE 2

0.7 mol of 1,4 - bis(p - hydroxycumyl)benzene was brought to melt temperature in a reactor fitted with an entry port, condenser, thermometer, means of stirring, and a heating mantle. 0.12 gram of tartaric acid was added and moderate stirring begun. Paraformaldehyde was added over a 30-minute period until the phenolic compound:formaldehyde mol ratio reached 1:0.83. Stirring was continued five minutes longer. The temperature reached 220° C. The cooled product was a clear, light amber solid having a softening point of 122° C.

The resin was cured as in Example 1. The cured resin was submitted for thermogravimetric analysis and was found to be completely stable in oxygen up to a temperature of 320° C. with a weight loss of only 5% up to 360° C.

Several additional runs were made following the procedure given above but varying the mol ratio of phenolic component to formaldehyde. The summary given below illustrates the variation in softening point which decreases with decreasing proportions of aldehyde.

| Mol Ratio Phenolic Compound: Aldehyde | Temperature, ° C. | Reaction Time, Min. | Softening Point, ° C. |
|---|---|---|---|
| 1:0.74 | 209–220 | 80 | 123 |
| 1:0.54 | 216–230 | 80 | 112 |
| 1:0.40 | 175–207 | 80 | 102 |
| 1:0.28 | 190–215 | 80 | 88 |

EXAMPLE 3

The procedure of Example 2 was repeated using 1,3-bis(p-hydroxycumyl)benzene with which a lower temperature can be used. Several runs are summarized below.

| Mol Ratio Phenolic Compound: Aldehyde | Temperature, ° C. | Reaction Time, Min. | Softening Point, ° C. |
|---|---|---|---|
| 1:0.99 | 148–160 | 80 | 118 |
| 1:0.72 | 150–180 | 80 | 105 |
| 1:0.53 | 150–168 | 80 | 87 |

EXAMPLE 4

Several runs were made employing 1,4-bis(p-hydroxycumyl)benzene in admixture with other phenolic compounds. In general these compositions have a somewhat higher softening point than resins prepared from 1,4-bis(p-hydroxycumyl)benzene alone at similar phenolic compound:formaldehyde mol ratio reached 1:0.71. Stirring runs is given below.

| Mol Ratio Phenolic Mixture | Mol Ratio Phenolic Mixture: Aldehyde | Temp., ° C. | Reaction Time, Min. | Softening Point, ° C. |
|---|---|---|---|---|
| 1:1 1,4-bis(p-hydroxycumyl)benzene/1,3-bis(p-hydroxycumyl)benzene. | 1:0.69 | 210–220 | 80 | 116 |
| 3:1 1,4-bis(p-hydroxycumyl)benzene/1,3-bis(p-hydroxycumyl)benzene. | 1:0.66 | 208–225 | 80 | 113 |
| 1:1 1,4-bis(p-hydroxycumyl)benzene/bis(4-hydroxyphenyl)dimethylmethane. | 1:0.75 | 205–210 | 30 | 128 |
| 3:1 1,4-bis(p-hydroxycumyl)benzene/bis(4-hydroxyphenyl)dimethylmethane. | 1:0.76 | 206–217 | 50 | 125 |
| 3:1 1,4-bis(p-hydroxycumyl)benzene/phenol. | 1:0.79 | 180–218 | 35 | 115 |

Representative samples of the above resins were cured as in Example 1 and submitted for thermogravimetric analysis. The resins were stable in air up to 300° C. with only about 5% weight loss up to 350° C.

EXAMPLE 5

0.18 mol of 1,4-bis(p-hydroxycumyl)benzene was added to a reactor as in Example 2 and heated to 209° C. Paraformaldehyde was added until the phenolic compound:formaldehyde mol ratio reached 1:0.7. Stirring was continued for 2 hours when the temperature reached 220° C. The cooled product was a light-brown solid having a softening point of 129° C.

It will be apparent that many modifications and variations may be effected without departing from the scope of the novel concepts of the present invention, and the illustrative details disclosed are not to be construed as imposing undue limitations on the invention.

We claim:

1. A fusible phenolic resin which is the reaction product of formaldehyde with a phenolic component containing at least 50 mol percent of a bisphenol selected from the group consisting of 1,4-bis(p-hydroxycumyl) benzene and 1,3-bis(p-hydroxycumyl)benzene.

2. An infusible water-resistant phenolic resin obtained by reacting formaldehyde with a phenolic component containing at least 50 mol percent of a bisphenol selected from the group consisting of 1,4-bis(p-hydroxycumyl) benzene and 1,3-bis(p-hydroxycumyl)benzene and curing the resulting product with hexamethylenetetramine.

3. A composition as in claim 2 wherein said phenolic component is 1,4-bis(p-hydroxycumyl)benzene.

References Cited

UNITED STATES PATENTS

| 2,926,149 | 2/1960 | Backer | 260—19 |
| 3,351,605 | 11/1967 | Harvey | 260—33.4 |
| 3,393,244 | 7/1968 | Broderick et al. | 260—619 |

WILLIAM H. SHORT, *Primary Examiner.*

HOWARD SCHAIN, *Assistant Examiner.*

U.S. Cl. X.R.

260—172, 28, 38, 54, 57, 59; 264—347